Figure 3:
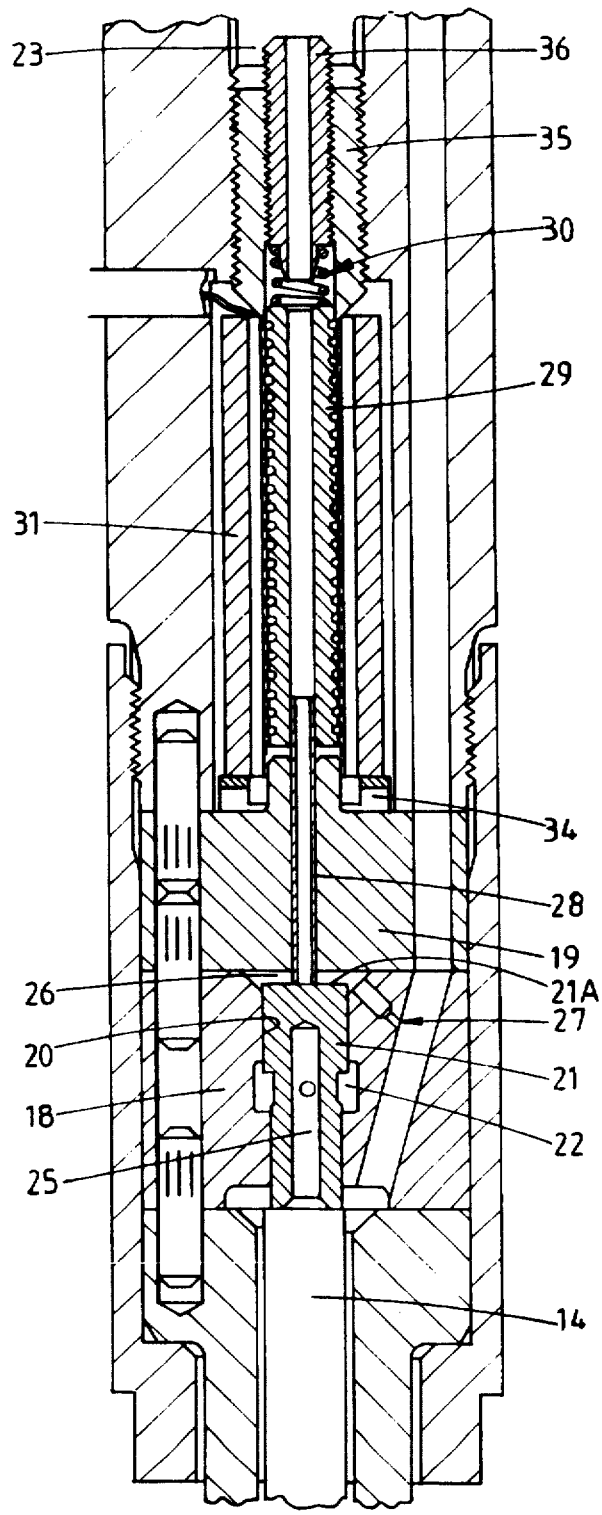

United States Patent [19]

Cooke et al.

[11] Patent Number: 5,544,815
[45] Date of Patent: Aug. 13, 1996

[54] FUEL INJECTION NOZZLE

[75] Inventors: Michael P. Cooke; George N. Felton, both of Gillingham, United Kingdom

[73] Assignee: Lucas Industries public limited company, West Midlands, England

[21] Appl. No.: 458,782

[22] Filed: Jun. 2, 1995

Related U.S. Application Data

[62] Division of Ser. No. 318,090, Oct. 5, 1994.

[30] Foreign Application Priority Data

Oct. 8, 1993 [GB] United Kingdom .................. 9320798

[51] Int. Cl.$^6$ ........................................ F02M 47/02
[52] U.S. Cl. .............................. 239/533.8; 239/585.1
[58] Field of Search ............................. 239/533.8, 124, 239/122, 585.1, 585.5; 251/129.06, 129.16, 129.21

[56] References Cited

U.S. PATENT DOCUMENTS

| | | | |
|---|---|---|---|
| 3,481,542 | 12/1969 | Huber | 239/533.8 X |
| 3,721,390 | 3/1973 | Jackson | 239/585.4 X |
| 4,566,416 | 1/1986 | Berchtold | 239/533.8 X |
| 4,898,468 | 2/1990 | Udd | 356/345 |
| 4,905,907 | 3/1990 | Ricco | 239/585.3 X |
| 5,011,113 | 4/1991 | Stobbs et al. | 251/129.21 X |
| 5,046,848 | 9/1991 | Udd | 356/345 |
| 5,311,592 | 5/1994 | Udd | 380/9 |

FOREIGN PATENT DOCUMENTS

| | | |
|---|---|---|
| 0318743A1 | 6/1989 | European Pat. Off. . |
| 372714 | 6/1990 | European Pat. Off. ............ 239/533.8 |
| 2 328 853 | 10/1976 | France . |
| 2028442 | 12/1971 | United Kingdom . |

OTHER PUBLICATIONS

J. P. Dakin et al., "A Novel Distributed Optical Fiber Sensing System Enabling Location Of Disturbance In A Sagnac Loop Interperometer", Proc. Of SPIE, vol. 838, pp. 325–328, 1987.

E. Udd, "Sagnac Distributed Sensor Concepts" Proc. Of SPIE, vol. 1586, pp. 46–52, 1991.

E. Udd et al., "Tension And Compression Measurements In Composite Utility Poles Using Fiber Optic Graftings", Proc. of SPIE, vol. 2574, pp. 14–19, 1995.

E. Udd, Editor, Fiber Optic Smart Structures, Wiley, 1995 Excerts pp. 401–403,407.

*Primary Examiner*—Kevin P. Weldon
*Attorney, Agent, or Firm*—Jacobson, Price, Holman & Stern, PLLC

[57] ABSTRACT

A fuel injection nozzle has a valve member engageable with a seating to prevent fuel flow through an outlet orifice. The valve member is engaged by the narrower end of a stepped piston member the surface of which remote from the valve member is subjected to fuel under pressure to bias the valve member into engagement with the seating. A tubular valve element the interior of which is connected to a drain, is engageable with the surface but can be moved away from the surface to lower the pressure applied to the surface. The valve member lifts away from the seating when the pressure applied to the surface is reduced by fuel pressure acting on a further surface defined on the valve member. The valve element is connected to the armature of a solenoid.

4 Claims, 5 Drawing Sheets

FIG. 1
FIG. 2
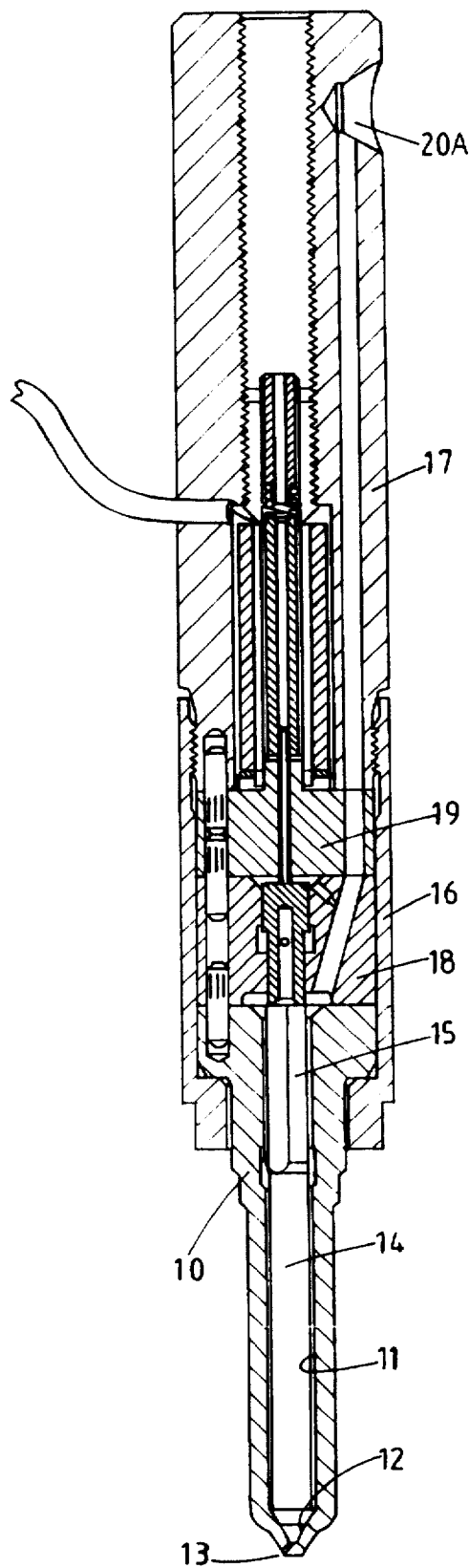
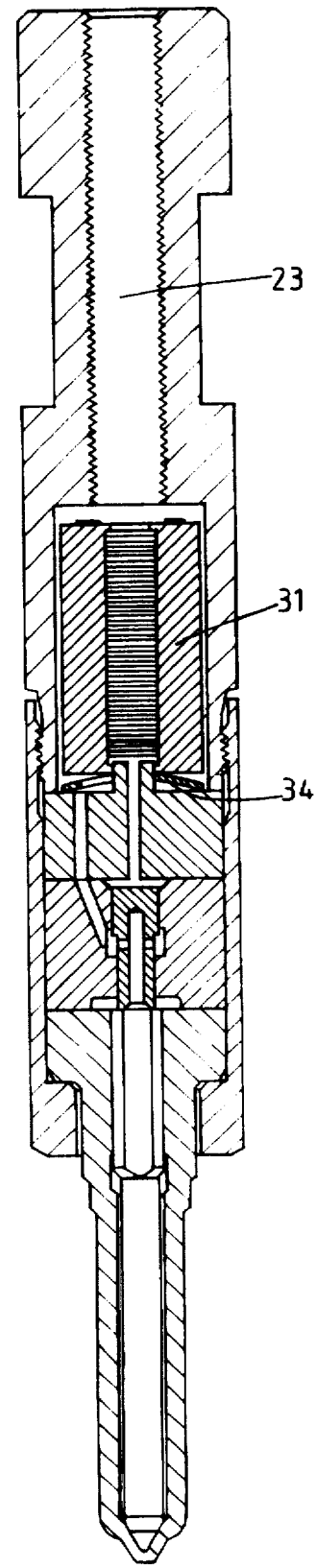

FUEL INJECTION NOZZLE

This is a DIVISIONAL of application Ser. No. 08/318,090 pending filed Oct. 5, 1994.

This invention relates to a fuel injection nozzle for supplying fuel to an internal combustion engine and comprising a nozzle body in which is defined a blind bore, a seating defined adjacent the blind end of the bore, valve means movable axially within the bore, the valve means being shaped for cooperation with the seating and being movable away from the seating to permit fuel to flow past the seating through an outlet orifice and the valve means defining a surface against which fuel under pressure can act to lift the valve means from the seating.

Such nozzles are well known in the art and it is usual for the valve means to be biased into engagement with the seating by a strong spring and for the surface defined by the valve means to have an area such that the force developed on the valve means when fuel under pressure is supplied to the nozzle is sufficient to move the valve means against the force developed by the spring. The valve means therefore lifts from the seating when the fuel pressure attains a predetermined value and therefore the timing of fuel delivery to the engine is dependent upon the rise in the fuel pressure and the manufacturing tolerances of the nozzle.

In order to meet the operating requirements of modern engines it is necessary for the timing of fuel delivery to the engine to be carefully controlled. This is the case particularly with compression ignition engines and the object of the present invention is to provide a fuel injection nozzle of the kind specified in which the initiation of fuel delivery is determined by a control signal which is supplied to the nozzle.

According to the invention in a fuel injection nozzle of the kind specified the valve means defines a further surface against which fluid under pressure can act to hold the valve means in engagement with the seating and there is provided a control element operable by a control signal from external of the nozzle, to reduce said fluid pressure when it is required to lift the valve means from the seating.

According to a further feature of the invention said fluid under pressure is fuel which is derived from a fuel inlet of the nozzle.

According to a still further feature of the invention the fuel under pressure which acts on said further surface of the valve means is supplied from said inlet by way of a restrictor.

Figure 4:
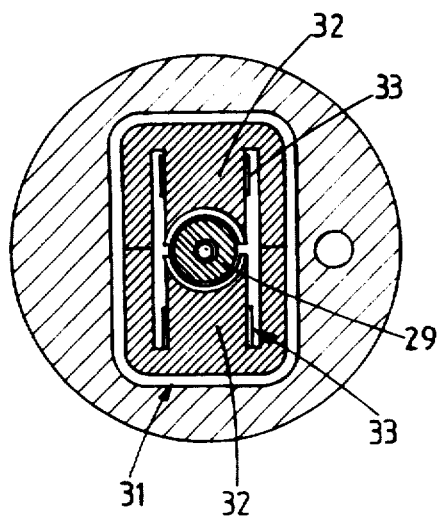
Figure 5B:
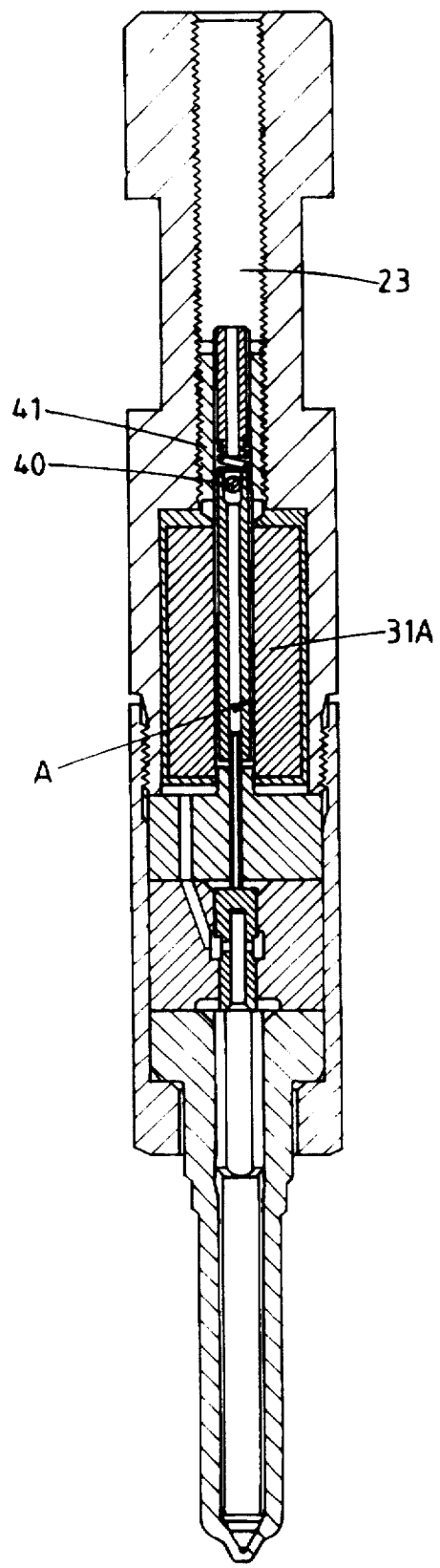
Figure 5A:
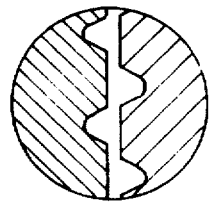

In the accompanying drawings:

FIG. 1 is a sectional side elevation of one example of a nozzle in accordance with the invention, FIG. 2 is a view similar to FIG. 1 taken at right angles to FIG. 1 with parts removed for the sake of clarity, FIG. 3 is a view to an enlarged scale of a portion of the nozzle as shown in FIG. 1, FIG. 4 is a section through a portion of the nozzle seen in FIG. 1, FIG. 5 shows a modification to the nozzle seen in FIG. 1.

Figure 6:
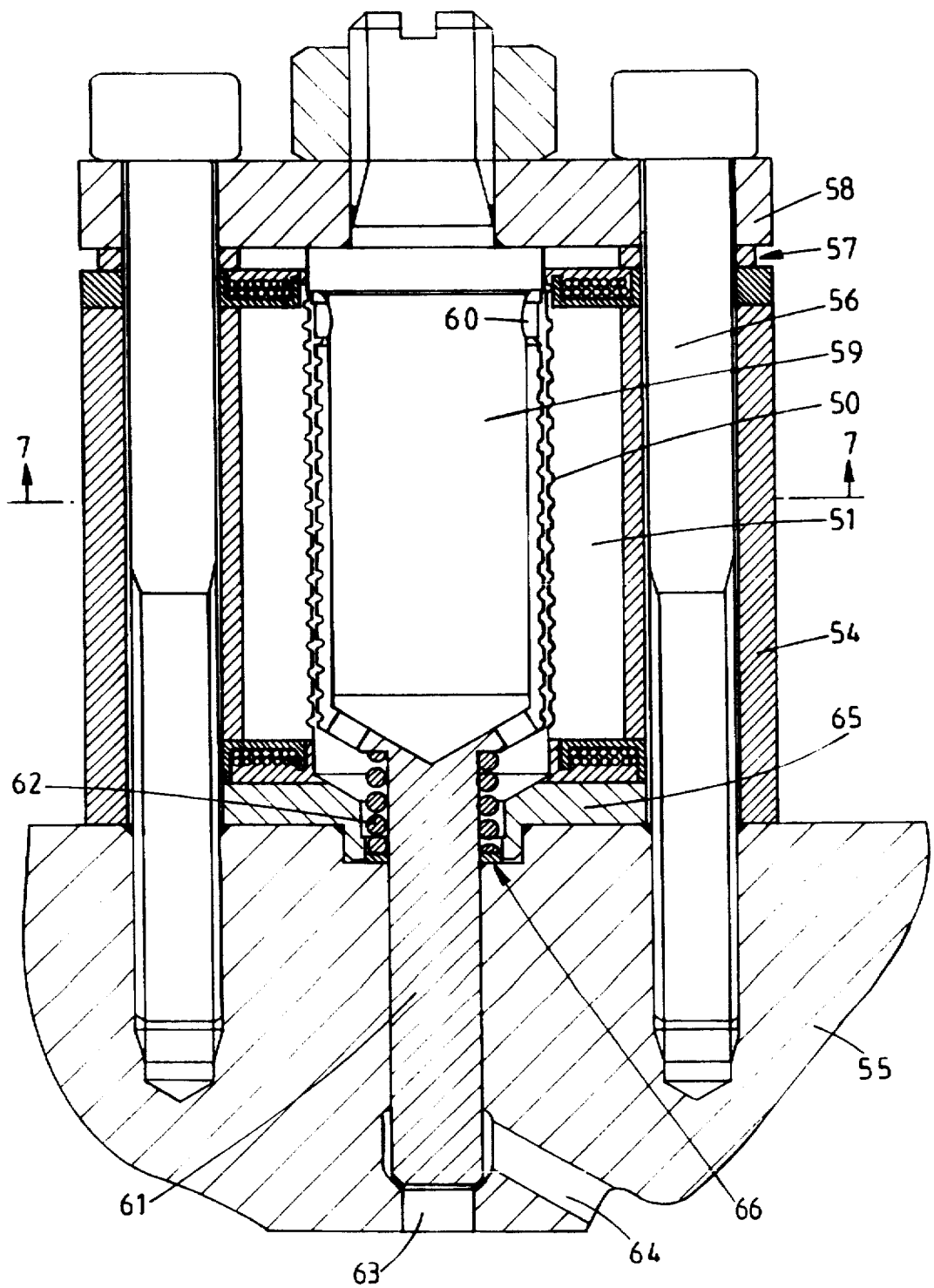
Figure 7:
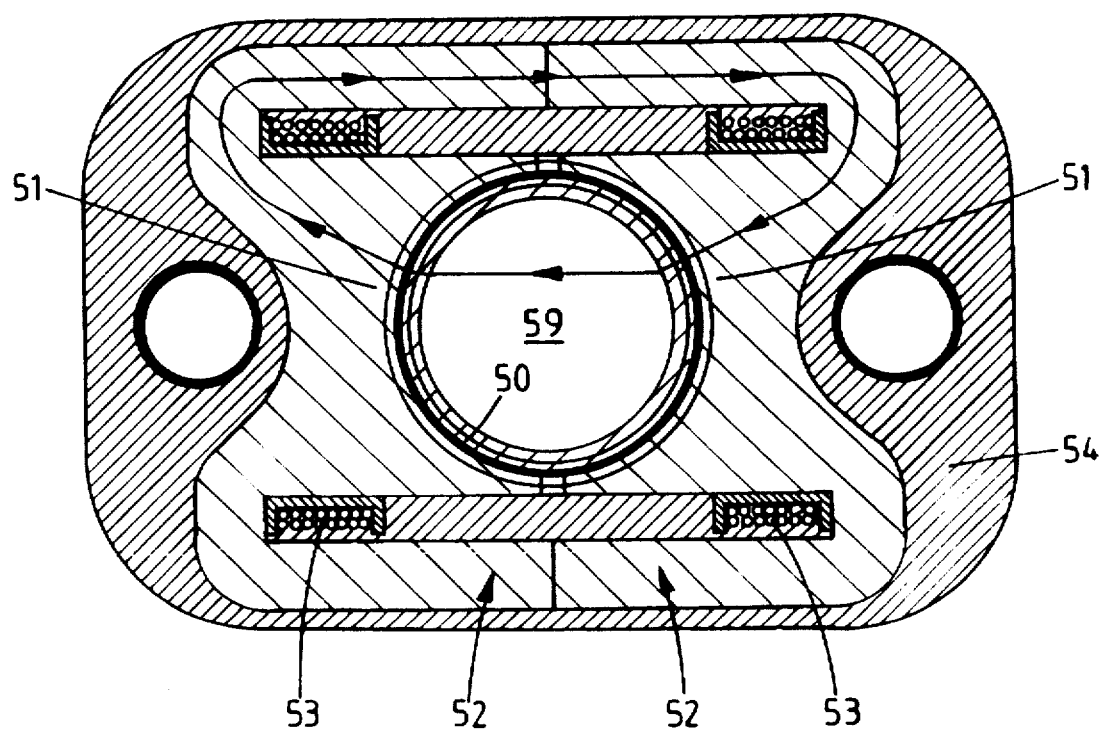

FIG. 6 shows in sectional side elevation an alternative construction for a part of the nozzle seen in FIG. 1; and FIG. 7 is a section on the line 7—7 of FIG. 6.

Referring to FIGS. 1–4 of the drawings the nozzle comprises a nozzle body 10 in which is defined a blind bore 11. Disposed at the blind end of the bore is a seating 12 and downstream of the seating there is formed an outlet orifice or orifices 13. Movable axially within the bore is a valve member 14 which is shaped for cooperation with the seating.

The valve member is in general slightly smaller than the bore but it is provided with a fluted portion 15 the flutes of which engage the wall of the bore to guide the movement of the valve member.

The nozzle body is provided with a flange which is engaged by a cap nut 16 whereby the nozzle body can be secured to a nozzle holder 17. Interposed between the holder and the flanged end of the nozzle body is a pair of valve housings 18, 19 which are located in end to end relationship. Moreover, the valve housings, the nozzle holder and the nozzle body are restrained against relative angular movement by means of location pins clearly seen in FIG. 1.

The nozzle holder defines a fuel inlet 20A which by way of a passage which extends through the holder and the valve housings, communicates with the open end of the bore 11. Conveniently the valve housing 18 defines recess in its face presented to the flanged end of the nozzle body. The fuel inlet 20A in use, is connected to a source of fuel under pressure. Formed in the valve housing 18 as more clearly seen in FIG. 3, is a stepped bore 20 and slidable in the bore is a stepped piston member 21. Intermediate the ends of the bore there is defined a gallery 22 which as seen in FIG. 2, communicates by way of a passage formed in the valve housings, with a drain passage 23 formed in the holder.

The narrower portion of the piston member 21 engages the valve member 14 and extending inwardly from the end of the piston member which engages the valve member is a blind drilling 25 which communicates with the gallery 22.

The wider end of the piston member opens into a chamber 26 which is defined by a recess in the valve housing 18 and this chamber communicates with the fuel inlet 20A by way of a restrictor 27.

Slidably mounted in the valve housing 19 is a tubular valve element 28 the bore in which communicates with the drain passage 23. The valve element is movable by means of an actuator which includes an armature 29 to which the valve element is connected and which is biased by means of a spring 30 towards the valve body so that the valve element engages with and can form a liquid seal with the wider end surface 21A of the piston member 21.

Associated with the armature 29 is a solenoid which includes a core member 31. As will be more clearly seen from FIG. 4 the core member is composed of two "E" cores with the pole pieces 32 defined by the central limbs, facing each other in spaced relationship and having curved pole faces which locate with clearance about the armature 29. The pole pieces 32 are surrounded by electrical windings 33 which can be connected to a source of electric supply whereby when current is passed through the windings the pole pieces will assume opposite magnetic polarity.

The armature is provided with a plurality of circumferential slots which are evenly spaced along the length of the armature and the faces of the pole pieces are similarly slotted. When the windings are supplied with electric current the ribs on the armature and on the pole faces tend to move into alignment with each other so as to reduce the magnetic reluctance of the magnetic circuit and it is intended that when the windings 33 are energised the tubular valve element 28 should be lifted away from the end of the piston member 21. It is therefore necessary to adjust the axial position of the core member 31 of the solenoid within the nozzle body and for this purpose the core member at its end adjacent the valve housing 19, bears against a leaf spring 34 which is in engagement with the valve housing 19. The core member can be urged against the action of the leaf spring 34 by means of an adjustable abutment 35 which is in screw thread engagement with a thread defined in the passage 23.

In addition, the spring 30 has a spring abutment 36 which is in screw thread engagement with the abutment 35.

In the closed position of the nozzle the various parts of the nozzle assume the position shown in the drawings. The spring 30 acts to maintain the valve member 14 in engagement with the seating 12 and the axial position of the core member 31 is set so that when the windings are energised the armature 29 will move against the action of the spring 30 and in so doing will lift the tubular valve element away from the wider end of the piston member 21.

Assuming now that the inlet 20A is connected to a source of fuel under pressure and the windings 33 are not energised.

In this situation the force exerted on the end surface 21A of the piston member 21 due to the fuel pressure in the chamber 26 is greater than the force exerted on the end surface of the valve member 14 which lies outside the seating area and as a result the valve member is held by the force exerted by the spring and by the difference in the forces due to fuel pressure, in engagement with the seating 12. When the windings 33 are energised the armature lifts the tubular valve element 28 away from the piston member 21 and as a result the pressure in the chamber 26 falls. The force exerted by the reduced fuel pressure acting on the piston member is less than the force exerted on the valve member and as a result the valve member is lifted from the seating to permit fuel flow through the outlet orifice 13. Such movement moves the piston member back towards the end of the valve element 28 so that the piston member and valve member assume a position which is determined by the axial position of the valve element and hence the armature. It is possible therefore by varying the current in the armature to control the axial position of the valve member 14 once it has opened so that the flow of fuel through the outlet orifice 13 may be controlled.

When the windings are de-energised the valve element 28 moves into engagement with the piston member 21 under the action of the spring 30 and exerts a closing force on the valve member 14. The spring force is supplemented by the force generated on the piston member 21 by the increased fuel pressure within the chamber 26.

The mass of the armature 29 is made as small as possible and the fact that the armature is of substantial length means that there is a large magnetic path area for a given mass so as to achieve a fast response.

In the arrangement which is shown in FIG. 5, the armature is provided with a helical groove or grooves as opposed to a plurality of circumferential and axially spaced grooves. The pole faces of the pole pieces are similarly provided with helical grooves. Moreover, the core member 31A is secured within the holder by encapsulation. In order to adjust the relative positions of the thread formations on the armature and pole faces, the armature is angularly adjustable by means of a pin 40 which is carried by a screw threaded adjustment member 41 located in the outlet 23, the adjacent end of the armature being provided with a slot to receive the pin.

The valve member 14 and the piston member 21 can be formed as one piece with the fluted portion 15 of the valve member deleted providing the valve member can be passed through the narrower portion of the bore 20. In this case the piston member serves as a guide for the valve member. It would also be possible to construct the valve housing 18 as part of the nozzle body 10 if the valve member with or without the fluted portion 15, is of equal or smaller diameter than the narrower portion of the bore 20.

Turning now to FIGS. 6 and 7, there is shown an actuator which includes a hollow cylindrical armature 50 and a core member. On the outer peripheral surface of the armature is formed a helical groove or grooves. The armature is located between the presented curved faces of the central pole pieces 51 of a pair of "E" cores 52 which form the core member. As in the earlier examples windings 53 are wound about the central pole pieces and these are connected together so that when supplied with electric current the central pole pieces 51 assume opposite magnetic polarity. The "E" cores are encapsulated in a body 54 and may be formed as solid material or by a series of laminations. The presented curved faces of the pole pieces 51 are formed with helical grooves which are complementary to the groove or grooves on the armature.

As shown the core/body 54 is secured to a valve housing 55 by means of bolts 56 which extend through elongated apertures in the body 54 and sandwiched between the heads of the bolts and shims 57 located next to the body is a support plate 58 which carries a rotatable plug 59 which extends with a small radial clearance, within the armature. The plug and armature are formed from magnetisable material. In addition, the plug carries a transverse pin 60 which is located within axial slots formed in the end of the armature.

In the example, the end of the armature 50 remote from the support plate 58 is coupled to a valve member 61 slidable within a bore formed in the valve housing 55. The valve member is shaped to co-operate with a seating defined in the bore and is biased by a spring 62 away from the seating to allow fluid flow between a pair of passages 63, 64 formed in the valve housing thereby providing an ON/OFF valve function. Conveniently a plate 65 having a depending hollow spigot is incorporated into the body 54 and a further shim 66 is interposed between the spring and the valve body.

When the windings are supplied with electric current the ribs defined between the grooves on the pole pieces and armature tend to move into alignment and the initial adjustment of the angular position of the armature is such that the armature moves downwardly against the action of the spring 62 thereby moving the valve member into engagement with the seating.

The plug 59 acts to convey the magnetic flux between the pole faces, an example of a flux line being seen in FIG. 7, so that the armature can have a thin wall section and therefore, be light. The travel of the armature is set by the shims 57 and the spring force by the shim 66. The armature may be formed from the same material as the valve member but if not may be formed from for example, soft iron and attached to the valve member. The plug 59 may be solid or formed as a stack or laminations.

The passages 63 and 64 may be connected to the chamber 26 and the drain passage 23 of the fuel injection nozzles seen in FIGS. 1–5 so that the actuator may be used to control the operation of the fuel injection nozzle. In this case however a separate spring corresponding to the spring 30 must be provided to bias the valve member 14 of the nozzle to the closed position.

We claim:

1. An actuator for a valve including a core member and an armature, the core member comprising a pair of "E" cores having their central pole pieces presented to each other, the faces of said central pole pieces being curved, said armature being of hollow cylindrical form and being located in spaced relationship between said faces, a helical groove formed on the outer periphery of the armature and complementary helical grooves formed on said faces of the pole pieces, electrical windings carried by said central pole pieces and connected so that when energised the pole pieces assume opposite magnetic polarity, means for adjusting the relative angular position of the armature and the central pole pieces and a plug located with clearance within the armature, the plug being formed from magnetizable material.

2. An actuator according to claim 1, in which the cores are encapsulated in a body, said body defining elongated apertures whereby it can be secured to a support by bolts extending through said apertures, and a support plate retained by said bolts relative to the body said support plate mounting said plug.

3. An actuator according to claim 2, including a pin carried by said plug the ends of the pin being located in slots formed in the armature to restrain the armature against angular movement.

4. An actuator according to claim 3, in which the plug is adjustably mounted on said plate whereby the angular position of the armature relative to the pole pieces can be adjusted.

* * * * *